(No Model.)
E. THOMSON.
PROCESS OF AND APPARATUS FOR FORMING AND WELDING METALS BY ELECTRICITY.
No. 434,530.　　　　　　　　　　Patented Aug. 19, 1890.
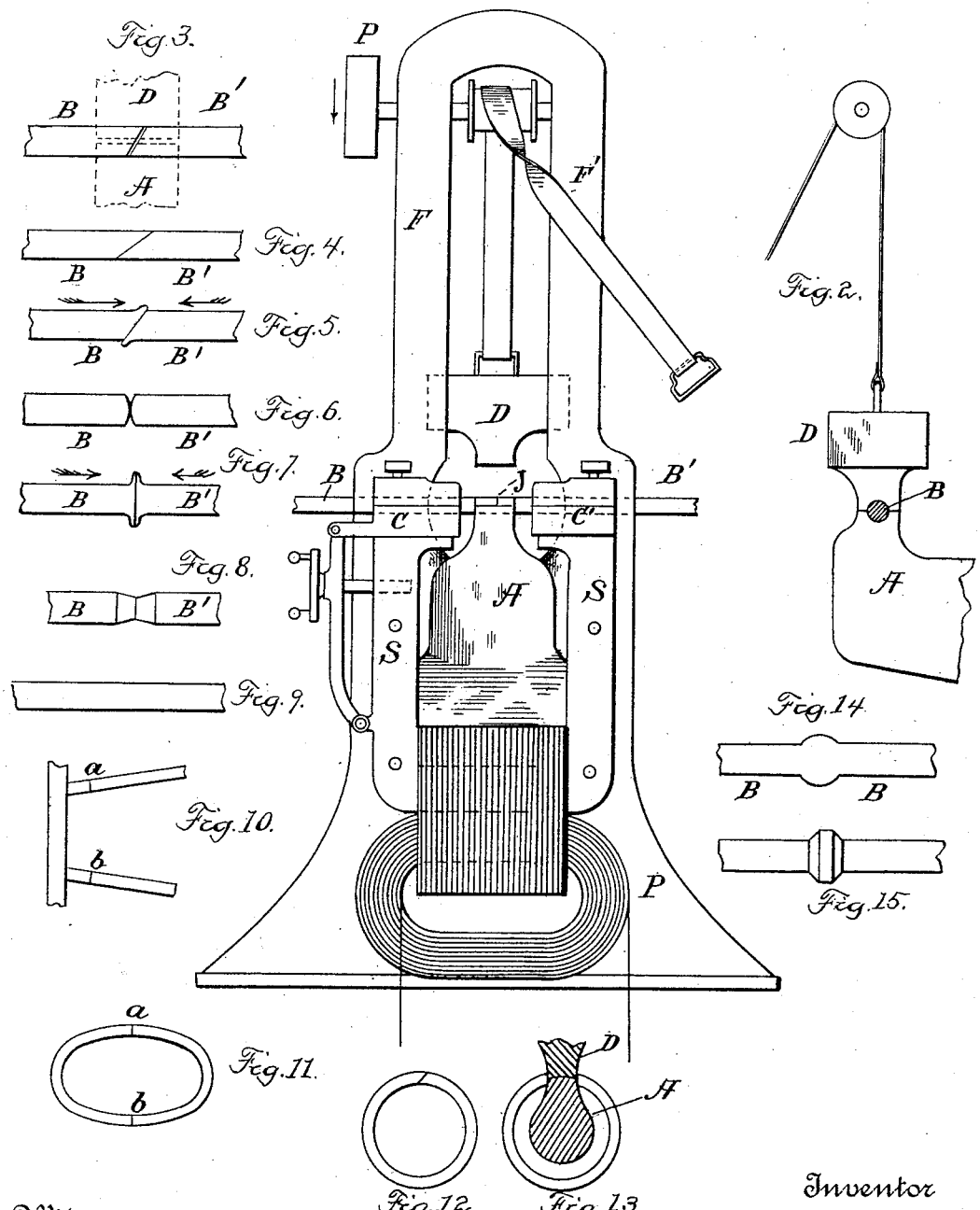
Witnesses
Ira R. Steward.
Wm H Capel
Inventor
Elihu Thomson.
By his Attorney
H. C. Townsend

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

PROCESS OF AND APPARATUS FOR FORMING AND WELDING METALS BY ELECTRICITY.

SPECIFICATION forming part of Letters Patent No. 434,530, dated August 19, 1890.

Application filed August 8, 1889. Serial No. 320,171. (No model.)

*To all whom it may concern:*

Be it known that I, ELIHU THOMSON, a citizen of the United States, and a resident of Lynn, in the county of Essex and State of Massachusetts, have invented certain new and useful Improvements in Forming and Welding Metals, of which the following is a specification.

My invention relates to the forming and welding of metals generally.

It consists in a novel process, hereinafter described, consisting in passing through the metal a current of sufficient volume to soften or render the same plastic and then swaging the metal into the form desired in a drop-press.

My invention consists, further, in the novel process, hereinafter described, of forming or forging metal, consisting in applying pressure to the metal while heated to plasticity by the passage of an electric current, and then swaging the metal, while still hot from the electric heating, into the form desired by a swage applied in a line transverse to the said line of pressure.

My invention is especially applicable to the formation of a finished joint between two metal pieces, and in this application involves the employment of my process of welding covered by my patent, No. 347,140, followed by the swaging of the joint into form under a drop-press applied transversely to the line of welding-pressure while the two metals are still hot from the electric heating and at the welding temperature, thus involving but a single heating in the production of a finished joint in any desired form. It is essential that the metal be kept at the welding temperature during the use of the drop-press or striking-die. The faces of the drop and the anvil on which the pieces are struck are made to conform to the desired shape of the pieces after joining, and of course these may be varied very widely without departing from the limits of my invention, which consists in heating and at the same time welding two bars electrically, and while the bars are still at the welding heat swaging them into the desired form by swaging or shaping dies applied from above or from both above and below. The metal must be plastic and weldable when the drop-form comes down upon it, in order to prevent creases or "cold-shuts" being driven into the metal or existing at the joint. I prefer, therefore, to combine some good form of drop-press and electric welding apparatus or device for feeding to the work very heavy currents of electricity. This combination of apparatus I find not alone confined to use in welding of pieces of metal, but it may be employed also with benefit to heat pieces locally for dropping into shape, though I have particularly applied it to the formation of joints between electrically welded bars or metal pieces.

My invention consists, also, in the novel combination of apparatus hereinafter described and claimed.

In the accompanying drawings, Figure 1 shows in side elevation a combination of apparatus invented by me suitable for practicing the process forming the subject of my present application and comprising a source of heavy currents for heating metal pieces placed in suitable clamps, means for moving the pieces together to form the joint or to swell the metal at the joint or between the clamps when no joint is formed, and a heavy shaping drop or former coming down upon the work or striking the work while it rests in the clamps upon an anvil, so as to give it the desired shape. Fig. 2 is an end elevation of a part of the apparatus in position when the blow is struck. Figs. 3 to 15, inclusive, show various kinds of work and details of the operation.

In Fig. 1, S S is a U-shaped heavy copper secondary supplying currents to metal pieces B B', held in suitable clamps C C'. One or both of said clamps are movable, and one, at least, must be movable in order to practice that modification of my invention which involves pressure combined with striking in a line transverse to the pressure. The conductor S S may be replaced by any other device capable of feeding very heavy current to the clamps and through the metal between them. I have simply indicated it as the secondary of an induction-coil whose primary is a coil P P, fed by alternating currents of proper character from any suitable source. The clamps C C' are suitably supported, so as to heat the bars B B' in the position shown, slightly above the anvil or lower frame A, which is in line with an upper hammer or drop D for striking the metal into shape after the pieces have been heated or welded at the point J between the clamps C C'. The mechanism which raises and lowers the drop or shaper D may be anything practicable for the purpose. I have simply indicated an ordinary strap or belt drawn over a friction-pulley constantly rotating, being driven by a driving-pulley P from the shaft above. The drop D moves, of course, in a frame F F', which guides it and causes it to come down squarely upon the work, delivering a quick and forcible blow upon the hot metal pieces. The parts of the drop are made suitable to the work to be done, especially the shape of its lower end, which of course may be made removable and replaceable by different forms of dies, as may also the top surface of the anvil A—a procedure usual in connection with drop-press mechanism. The one clamp C is made movable toward and from the other clamp C', in order to form the abutted pieces B B' or to allow them to move toward one another where they are to be heated and welded, or to apply pressure to the metal where the pieces B B' are replaced by a single metal piece joining the clamps C C', so as to make a swell or expansion in the metal. Where this swell or expansion is not needed, the clamps C C' may be made fixed in position.

In Fig. 2 the section of the bar or piece B is shown to be compressed between the drop D, which has descended, and the anvil A, which is immediately below the bar B, without being in actual contact therewith until the blow is struck. Indeed the anvil A may be made movable toward the drop D in any suitable manner, so that the blow may be struck from both sides upon the metal. This is a matter of mechanical detail which is not necessary to dwell upon. When the pieces are to be welded under the drop, the part D is raised and sustained in an elevated position. The bars B B' are put into the clamps, slightly clearing the lower anvil A, preferably, and abutted fairly well. The current is put on while the pieces are being pressed together at the joint J, and gradually the joint attains a welding heat, as well as a section of the bars on each side of the joint. At this moment the drop D is allowed to fall and completes the work, after which the welded piece may be removed for the insertion of others, which are to be treated in the same manner.

One of the ways of preparing the ends of the pieces is shown in Fig. 3, the two ends being slightly scarfed or slightly tapered before welding between the drop D and the anvil A. It is found that this preparation, which is shown in a still more exaggerated form in Fig. 4, produces a partial lap and a partial butt-weld of very great strength and uniformity.

Fig. 5 shows how the pieces are pressed together when they become plastic and before the descent of the drop. They tend to ride up a little one upon the other on account of the slanting surfaces. As soon as the welding heat is reached the descent of the drop welds and completes the joint.

For butt-welding, the pieces may be prepared with a rounding surface, as in Fig. 6, placed in contact and afterward pushed up to form a burr or expansion, Fig. 7, before dropping. It is advisable, however, in welding not to form too great an expansion of this kind, and it is also desirable that the clamps C C', one or the other, be movable toward the other when the drop comes down, so that the metal may spread endwise during the formation or shaping of the bar. This latter precaution may be entirely obviated by striking the pieces when they have attained, from the shapes shown in Fig. 6, a partial butt-weld, (indicated in Fig. 8,) a slight depression existing around the joint or metal section, which, when the drop descends, is completely filled up with the hot and plastic metal at the welding temperature, so as to give a finished and smooth surface, as in Fig. 9.

By making the surface of the drop and anvil more complicated in outline almost any form of work may be accomplished. Thus two joints, Fig. 10, a b may be made and finished in one operation, and in making a chain-link of two of the pieces, Fig. 11, both joints a b may be struck at one operation into the desired form.

In welding curved work—such as rings or tires—the preparation of the ends and treatment is the same as before mentioned, except that the curved surfaces of the drop take the place of those shown for straight surfaces in Fig. 1, or, rather, the form of the drops or preparation of surfaces is made to conform to the shape of the ring or tire, Figs. 11 and 12.

In giving any desired conformation to a piece of metal which is continuous between the clamps the operation is similar. The piece of metal, as a bar, having been placed in the clamps and suitably heated by the passage of current, is given a swell in the middle, as in Fig. 1, by the application of endwise pressure by means of the clamp C, after which a suitably-shaped drop and anvil, between which the metal is struck while heated in a direction transverse to the line of pressure, gives the swelled portion the modified shape or conformation shown in Fig. 14, or any other desired shape, according to the conformation of the die-surfaces of the drop-press.

What I claim as my invention is—

1. The herein-described process of forming metal into any desired shape, consisting in placing the metal into an electric circuit between two clamps, holders, or abutments, passing an electric current through the same in volume sufficient to heat the metal to plasticity, communicating end pressure to the work in a line parallel to the line joining the clamps or holders, and then swaging the metal, while still heated and retained in position between the clamps, holders, or abutments, into the desired form by devices applied in a line transverse to the line joining the holders and conforming to the desired shape of metal.

2. The herein-described improved process of welding and forming metal at the joint, consisting in abutting the pieces to be welded, passing an electric current from one to the other, subjecting the pieces to end pressure, so as to unite them and cause a tendency to lateral swelling or expansion at the joint, and then swaging the joint into form through the action of formers applied in a line transverse to the line of preliminary pressure and conforming to the ultimate shape of the metal desired at the joint.

3. The herein-described process of forming metal into any desired shape, consisting in securing the metal between two clamps or abutments, heating the metal by an electric current passing from one clamp or abutment to the other through the metal between them, moving one of the clamps toward the other and then applying a swaging device having surfaces of the desired form in a direction transverse to the line of movement of the clamps.

4. The combination, substantially as described, in an electric metal-working apparatus, of two clamps or holders adapted to hold a piece of metal between them, means for imparting movement of one holder toward the other, so as to subject the work to end pressure while heated by the electric current passing through the work from one holder to the other, and a metal swaging or forming apparatus the anvil and tool of which are arranged, respectively, at opposite sides of the line joining the clamps or holders and in position to engage the work in the clamps, as and for the purpose described.

5. The combination, substantially as described, of an electric welding apparatus having means for moving one of its clamps or holders toward the other, a swaging apparatus the anvil and die of which are arranged at opposite sides of the line joining the clamps of the welding apparatus and in position to engage the part of the work in position between the clamps of the welding apparatus, as and for the purpose described.

6. The combination, substantially as described, in an electric metal-working apparatus, of two clamps or holders connected with a source of heavy currents and provided with means whereby end pressure may be communicated to the work while heated between them, and a drop-press the anvil of which is arranged to one side of the line joining the clamps and in proximity to the work held in the clamps.

7. The combination, substantially as described, in an electric metal-working apparatus, of two clamps or holders provided with means for moving them toward one another while the work is heated electrically between them, and a drop-press the anvil and drop of which are arranged at opposite sides of the line joining the clamps or holders and in position to engage with the work while held between them.

Signed at Lynn, in the county of Essex and State of Massachusetts, this 1st day of August, A. D. 1889.

ELIHU THOMSON.

Witnesses:
JOHN W. GIBBONEY,
A. L. ROHRER.